Figure 4:
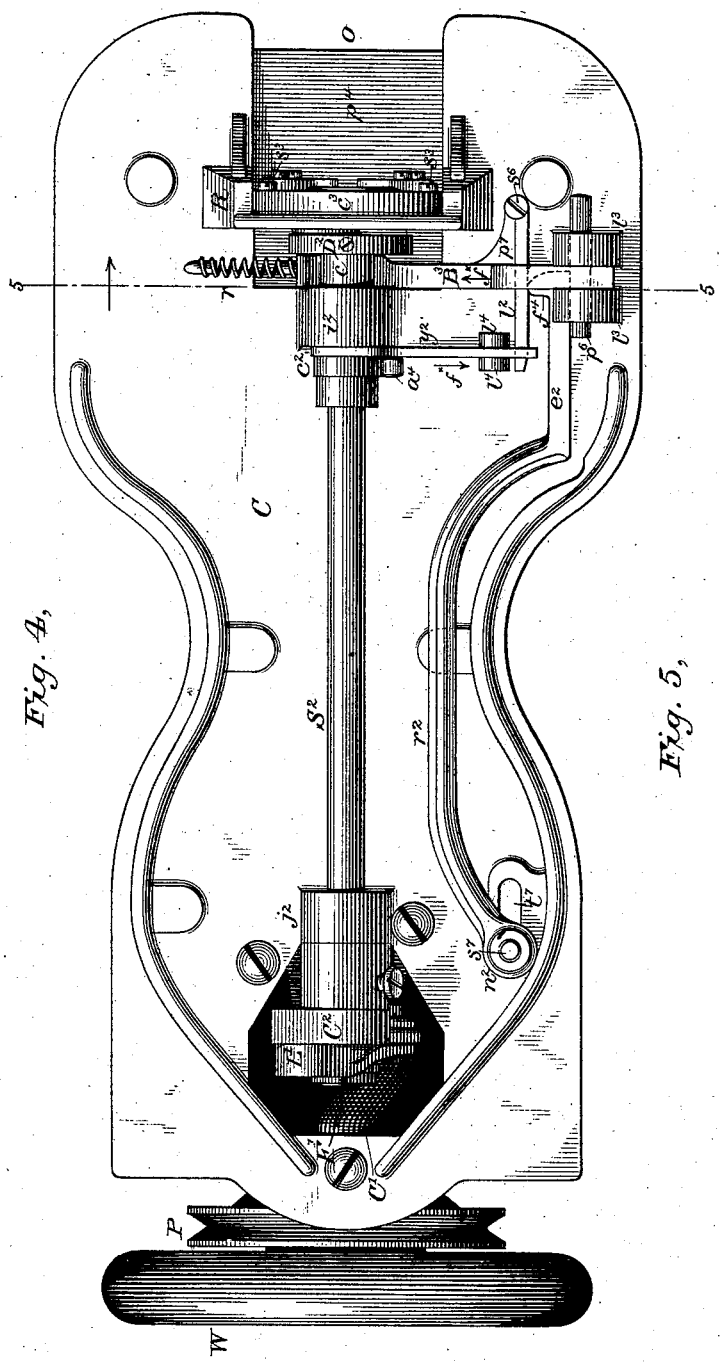

(Model.)
6 Sheets—Sheet 1.
A. M. LESLIE.
SEWING MACHINE.
No. 261,363. Patented July 18, 1882.
Fig. 1,
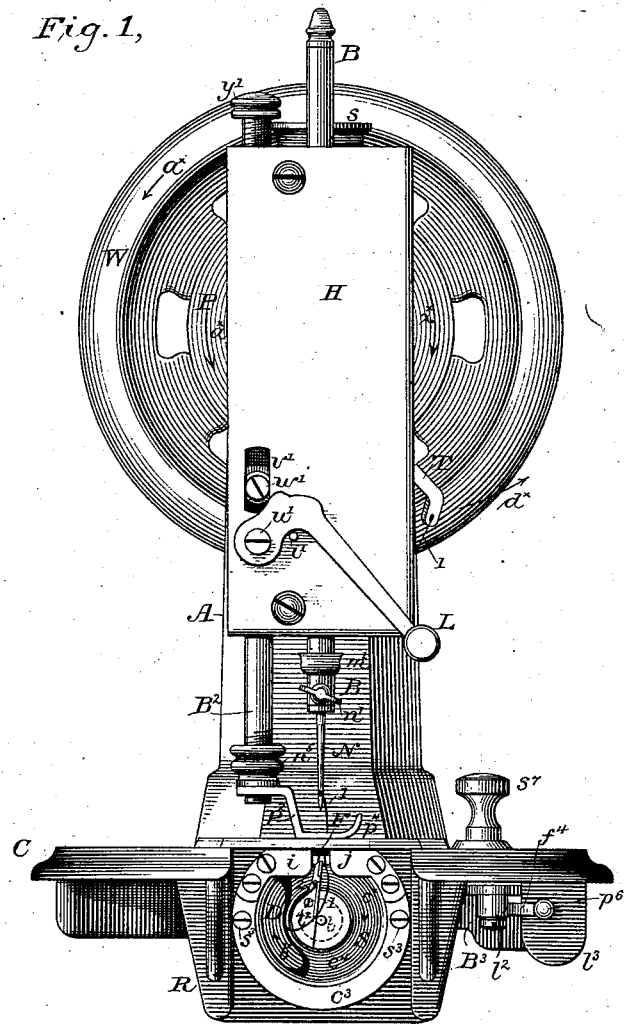
Fig. 2,
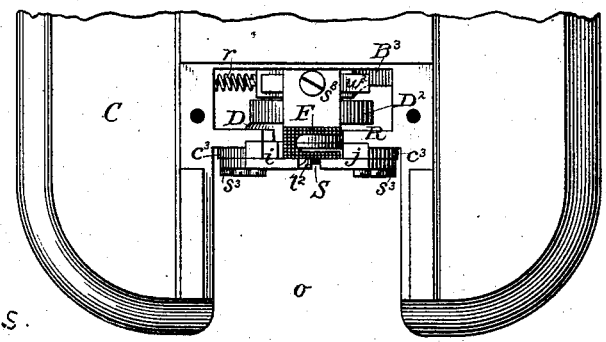
WITNESSES.
Wm A. Skinkle
Geo. W. Breck
INVENTOR.
Arthur M. Leslie,
By his Atty (Model.)
A. M. LESLIE.
SEWING MACHINE.
No. 261,363.   Patented July 18, 1882.
6 Sheets—Sheet 2.
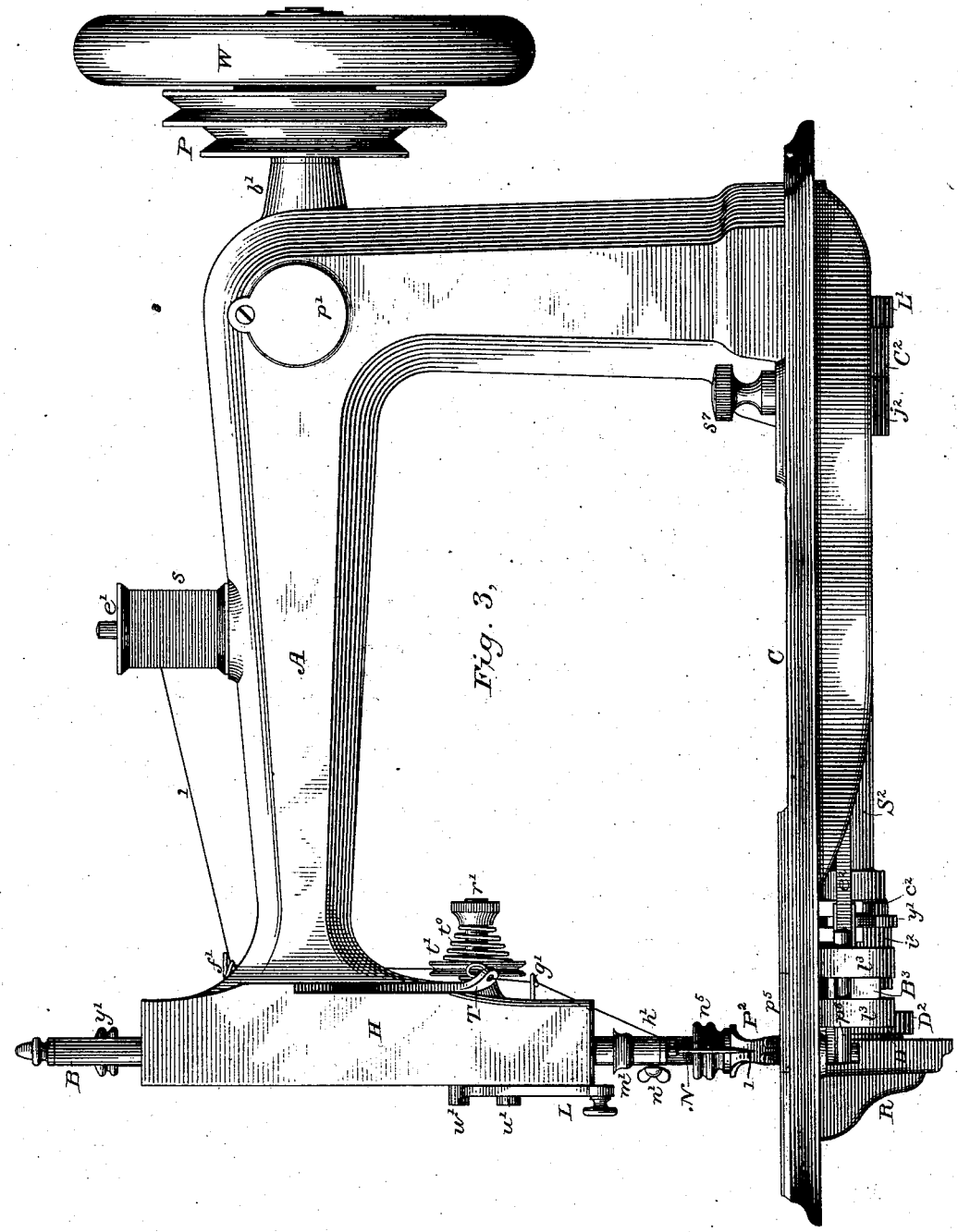
WITNESSES.
INVENTOR.
Arthur M. Leslie, (Model.)

6 Sheets—Sheet 3.

A. M. LESLIE.
SEWING MACHINE.

No. 261,363. Patented July 18, 1882.

WITNESSES.
Wm A. Skinkle
Geo. W. Breck

INVENTOR.
Arthur M. Leslie,
By his Atty (Model.)

6 Sheets—Sheet 4.

A. M. LESLIE.
SEWING MACHINE.

No. 261,363. Patented July 18, 1882.

WITNESSES
Wm. A. Skinkle
Geo. W. Breck

INVENTOR
Arthur M. Leslie.
By his Attorney (Model.)
6 Sheets—Sheet 5.
A. M. LESLIE.
SEWING MACHINE.
No. 261,363.  Patented July 18, 1882.
Fig. 7,
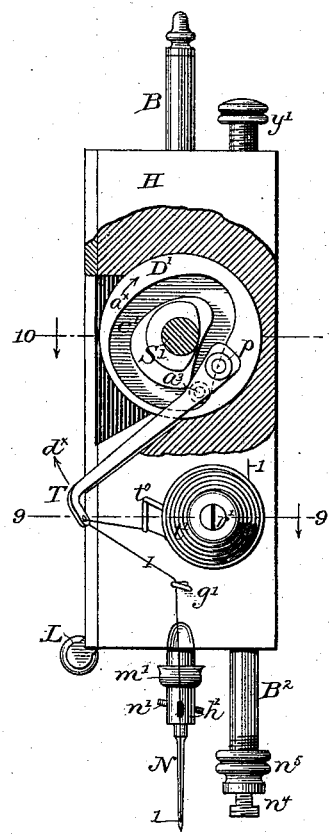
Fig. 8,
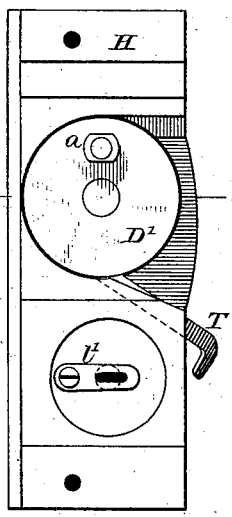
Fig. 7,ˣ
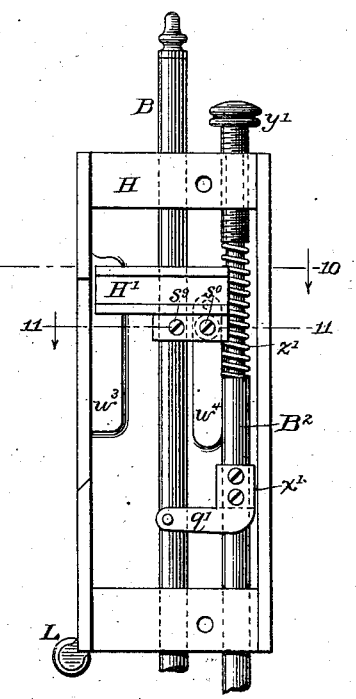
Fig. 9,
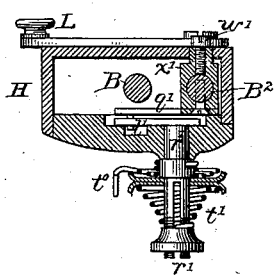
Fig. 10,
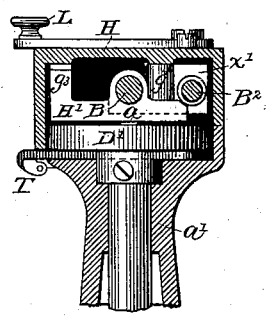
Fig. 11,
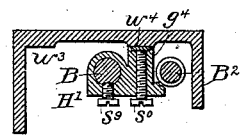
Fig. 12,
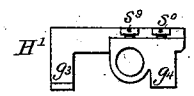
WITNESSES
Wm. A. Skinkle
Geo. W. Breck
INVENTOR.
Arthur M. Leslie,
By his Atty (Model.)

A. M. LESLIE.
SEWING MACHINE.

No. 261,363.  Patented July 18, 1882.

WITNESSES
Wm. A. Skinkle
Geo. W. Breck

INVENTOR
Arthur M. Leslie,
By his Atty

UNITED STATES PATENT OFFICE.

ARTHUR M. LESLIE, OF CHICAGO, ILLINOIS.

SEWING-MACHINE.

SPECIFICATION forming part of Letters Patent No. 261,363, dated July 18, 1882.

Application filed September 29, 1881. (Model.)

*To all whom it may concern:*

Be it known that I, ARTHUR M. LESLIE, a citizen of the United States, residing at Chicago, in the State of Illinois, have invented a new and useful Improvement in Sewing-Machines, of which the following is a specification.

This invention is additional to the improvement in sewing-machines for which Letters Patent of the United States No. 241,553 were granted to me May 17, 1881; and it consists in certain novel features of construction which have been embodied in my rotary-shuttle sewing-machine, but may, in part, be embodied in other sewing-machines—to wit: first, in a combined bobbin latch and ejector in a single moving part pivoted within a radial recess in the shuttle as improved means for securing and releasing the bobbin of a disk-shuttle; secondly, in a non-rotary bobbin-case constructed with a circumferential flange on its periphery to engage with the said bobbin-latch within a rotary shuttle without obstructing the escape of the under thread at the face of the shuttle; thirdly, in a peculiar composite arm attached to the said bobbin-case and forming a superior tension for the under thread and means whereby the case is rendered non-rotary; fourthly, in an improved four-motion feed mechanism comprising a peculiarly-supported sliding yoke, lever-arm, and fulcrum-slide, the two latter in one and the same horizontal plane, as means for transmitting motion from the stroke-cam; fifthly, in a steel pin suitably supported and arranged, forming at once a support for the front end of the feed-bar and a non-wearing abutment for the said fulcrum-slide; sixthly, in a supplemental take-up or take-up spring connected with the presser-bar in a peculiar manner as improved means for regulating the slack in the upper thread by the thicknesses beneath the presser-foot.

Figure 5:
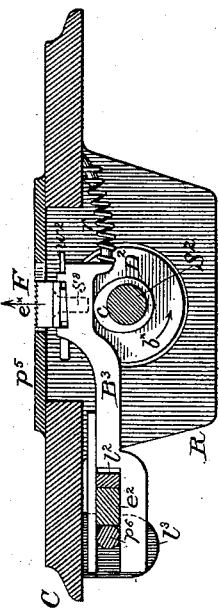
Figure 6:
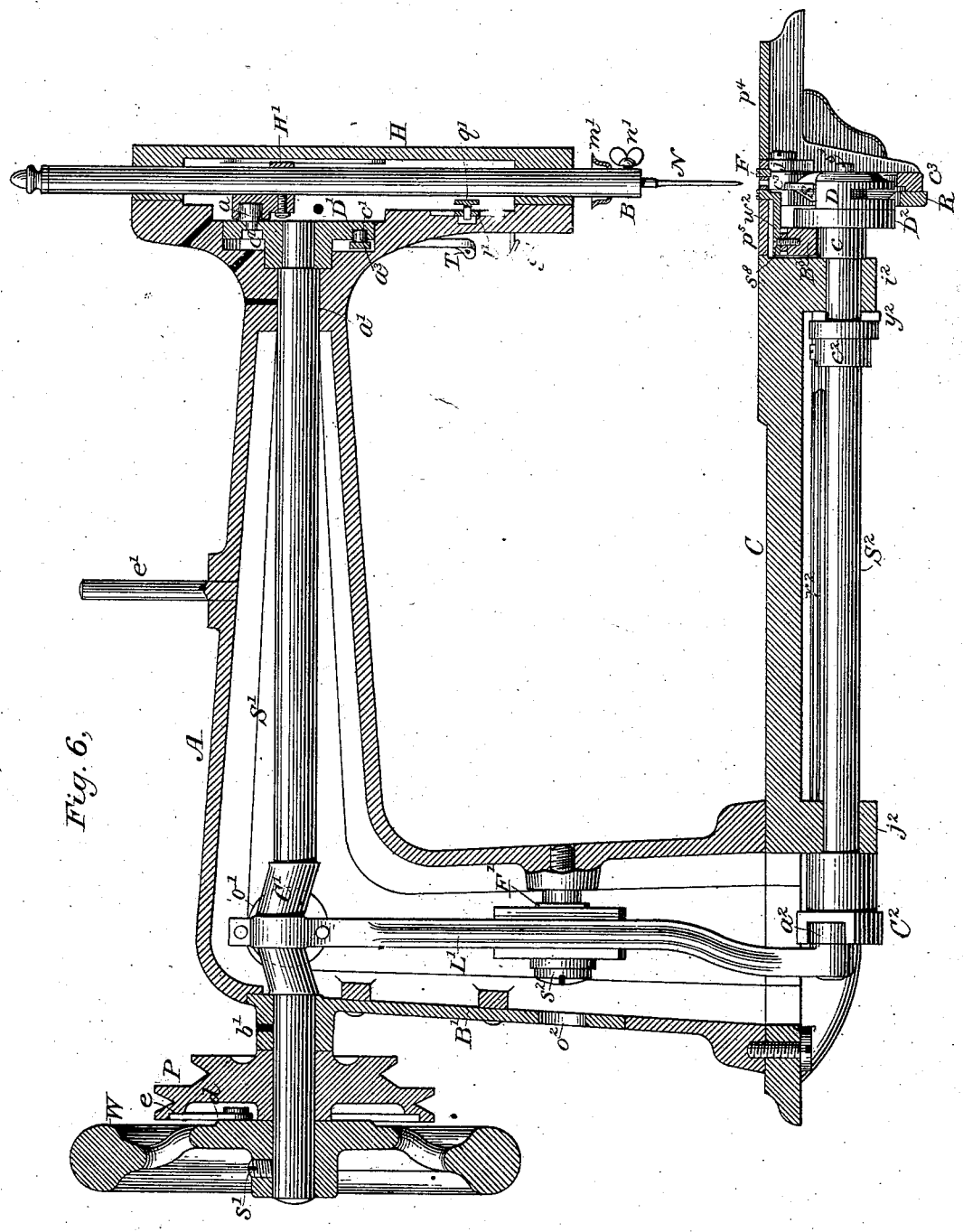

Figure 1 of the accompanying drawings is a face view of my improved machine, and Fig. 2 is a top view of the left-hand end of the cloth-plate and of the parts beneath the cloth-plate slide and throat-plate as exposed by removing the latter. Fig. 3 is a side elevation, showing the "front" of the machine. Fig. 4 is a bottom view of the machine; and Fig. 5 represents a vertical section on the line 5 5, Fig. 4. Fig. 6 represents a vertical longitudinal section of the machine, viewed from behind a central plane of section. Fig. 7 represents a sectional back view of the head of the machine, showing the upper shaft in cross-section in the plane of the take-up cam; Fig. $7^\times$, a back view of the face-plate part of the head, showing the needle-heart and other parts within the same; Fig. 8, a face view of the integral part of the head, showing the surfaces which are exposed by removing said face-plate part; Figs. 9 and 10, horizontal sections on the lines 9 9 and 10 10, Fig. 7; Fig. 11, a horizontal section on the line 11 11, Fig. $7^\times$, omitting all below the plane of section; and Fig. 12, a bottom view of the needle-heart detached. Figs. 13 to 20, inclusive, are detail views of the shuttle and its appurtenances on a larger scale, Fig. 13 being a face view of the shuttle with threaded bobbin and bobbin-case therein, and Fig. 14 a section on the line 14 14, Fig. 13; Fig. 15, an elevation of the bobbin and bobbin-case separated and stripped; Fig. 16, a face view of the empty shuttle; and Fig. 17, a section on the line 17 17, Fig. 16; and Fig. 18, a back view, and Figs. 19 and 20 edge views, of the empty shuttle.

Like letters of reference indicate corresponding parts in the several figures.

C represents the cloth-plate of the machine; A, its arm; H, its head, and R the shuttle-race.

$S^1$ represents the upper shaft, supported by bearings $a^1$ $b^1$ within the horizontal part of the arm, the bearing $b^1$ being integral with a removable back plate, $B^1$, Fig. 6; P, a loose driving-pulley of two diameters, connected to a hand-wheel, $w$, fast on the protruding right-hand end of said shaft, by an automatic clutch, $d\ e$, Fig. 6; $S^2$, the under shaft, supported by hanger-bearings $i^2\ j^2$ beneath the cloth-plate; $C^1$, a crank integral with said upper shaft in line with the upright part of the arm A; $C^2$, a crank-disk on the right-hand end of the under shaft $S^2$; $L^1$, a lever-pitman connecting said crank and crank-disk; and $F^1$, the rocking fulcrum of said lever-pitman, said crank-disk $C^2$ being constructed with a radial groove in which a laterally-projecting anti-friction roller on the lower end of said lever-pitman works as means for coupling the two. An orifice, $o^1$, Fig. 6, is in the face of the arm covered by a swinging dust-cap, $p^1$, Fig. 3, giving more convenient access to the journal-head of said lever-pitman.

$D^1$ represents the needle-driver disk, carried by the left-hand end of the upper shaft; B, the needle-bar, and N the needle.

$D^2$ represents the shuttle-driver disk, carried by the left-hand end of the under shaft; D, the shuttle-driver, and S the shuttle.

T represents the take-up lever-arm, projecting at the front edge of the head H, and actuated by a cam-groove, $c^1$, in the back of said disk $D^1$, through an anti-friction roller, $a^3$, Fig. 6, being pivoted by a stud-pin, $p$, integral therewith, occupying a pivot-hole drilled therefor in the rear part of said head; and $B^3$ represents the four-motion feed-bar, resting on a lifting-cam, $c$, integral with said disk $D^2$; and F, the feed-dog, adjustable vertically by screw $s^8$ and wedge $w^2$, Fig. 5.

The pulley P, it will be supposed, is connected by band with the driving-wheel of a treadle mechanism in customary manner, one or the other of its grooves being used, according to the relative speed at which the user desires to run the machine. It is adapted to be driven backward for actuating a bobbin-winder or the like in a customary way by means of the driving-band or pulley while the machine is otherwise at rest. When said pulley P is driven forward "even" motion is transmitted to the rotary upper shaft, $S^1$, through the hand-wheel W and through media $D^1 H^1$ B to the needle and take-up lever-arm in the most direct manner, while through the crank-connection $C^1 L^1 C^2$ an uneven or "fast-and-slow" rotary motion in a reverse direction is imparted to the under shaft, $S^2$, and through the disk $D^2$ to the shuttle-driver D, the rotary shuttle being actuated by the latter in the peculiar manner set forth in my previous specification, while the feed-dog at the same time and by the same means in part receives its motions through the feed-bar $B^3$, as hereinafter more fully set forth.

Arrow $x^\times$, Fig. 1, represents the independent backward motion of the pulley P; arrows $a^\times$, Figs. 1 and 7, the effective forward motion of said pulley and the motion of the hand-wheel, upper shaft, and needle-driver disk therewith; arrows $b^\times$, Figs. 1 and 5, the backward fast-and-slow motion of the under shaft, shuttle-driver disk, and shuttle-driver; arrow $c^\times$, Fig. 1, the independent forward motion of the loose shuttle; arrows $d^\times$, Figs. 1 and 7, the effective stroke of the take-up lever-arm; and arrows $e^\times$ and $f^\times$, Figs. 5 and 4, the effective movements of the feed-bar and feed-dog.

1 represents the upper thread, taken from a conveniently-located commercial spool, $s$, and 2 the under thread, taken from a central disk-bobbin, $b$, within a non-rotary bobbin-case, $b^2$, in the exposed bobbin-chamber $c^4$ of the shuttle, any twisting of the thread being precluded, while said bobbin-case and bobbin are removable together at will through the annular cap-plate $c^3$ of the shuttle-race without disturbing the shuttle, and said cap-plate, being attached by screws $s^3$, provides for readily removing the shuttle, as before, without disturbing the shuttle-driver, to facilitate repairs and cleaning, as illustrated by Figs. 1 and 2.

The details of the shuttle-furniture, to which the first three parts of the present improvement relate, together with the details of the shuttle as now manufactured, are illustrated by Figs. 13 to 20 in connection with Figs. 1 and 2.

To lighten the shuttle S and reduce the unequal effect of centrifugal force thereon, its thicker or wider side is recessed or made hollow behind, as shown at $y$, Figs. 14, 18, and 19, a guard, $g$, in the form of an incline, spanning the recess $y$ near the point $x$ to facilitate casting off the needle-loops, or, in other words, to keep them from catching on the rearwardly-projecting central portion of the shuttle. A solid axial stud or hub, forming part of the shuttle, renders the bobbin-chamber $c^4$ annular, and a recess, extending radially from said hub and terminating outside of said chamber, accommodates a combined bobbin-retaining latch and ejector, $l\ e$, which works on a screw-pivot, $k$, parallel to the face of the shuttle, and is adapted to be actuated to release and throw out the bobbin by the simple pressure of a pencil-point, pin, or the like against the exposed surface of the latch, being provided with a small countersink or depression near its outer extremity to facilitate so actuating it. The ejector part consists of a spring-finger, $e$, rigidly attached to the inner end of the latch-body $l$ at the back of the shuttle, and serves to keep the latch fastened while the bobbin and its case are in place, as shown in Fig. 14, and to eject the same or cause it to protrude to a sufficient extent when the latch is thrown back, as shown in Fig. 17, to unfasten the bobbin and its case. The latch proper consists of a beveled projection on the latch-body $l$, so arranged as to project into the bobbin-chamber through its circumferential wall, as shown in Fig. 14, and this engages with a circumferential flange, $f$, on the bobbin-case.

The non-rotary bobbin-case $b^2$ has a central sleeve, $u$, Fig. 15, fitted to the shuttle-hub, and the bobbin $b$ rotates upon this sleeve free from contact with any part of the rotary shuttle. The particular means provided for rendering the bobbin-case "non-rotary" and for the purposes of an under-tension consist chiefly of a composite arm, $t^2$, Figs. 1 and 2 and 13 to 15, comprising a pair of blade-springs, $v\ v^2$, united rigidly to each other and to the bobbin-case at the lower end of the arm and separated more or less at their free upper ends to regulate the tension of the under thread, 2, by means of a little screw, $s^5$, fitted to a tapped hole in the inner and lighter spring, $v^2$, and engaging with the face of the bobbin-case at its inner end. (See Fig. 15.) The outer spring, $v$, is supported at the proper distance from the face of the bobbin-case by a stud-pin, $q$, in line horizontally with a lateral hole, $h$, in the bobbin-case, and is itself provided with a threading-notch, $h^2$, in its opposite edge, as shown in Fig. 13. A minute spring-finger, $f^2$, attached to the outer surface of the spring $v$, projects over said notch $h^2$ to keep the needle-loops from catching therein, and a rigid guard-flange, $f^3$, is attached to the bobbin-case at the inner lateral edge of the springs, as shown in Fig. 14, for a like purpose. The upper ends of the springs $v$ $v^2$ are bent inward, so as to lie close to the outer face of the shuttle when in working position, as shown in Fig. 14, and are provided respectively with an inwardly-projecting stud-pin, $p^3$, and a hole to receive the same, to prevent the escape of the under thread laterally from between the springs, while the upper extremity of the spring $v$ is constructed with an outwardly-projecting smooth flange to engage with stops $i$ $j$, Figs. 1 and 2, attached to the face of the shuttle-race cap at top, for keeping the arm $t^2$ in position when the machine is at rest and when it is suddenly stopped and started.

The bobbin $b$ has been constructed with a tongue, $t$, Fig. 15, thrown out from the metal of its sleeve-hub, to keep the under thread from slipping thereon, and is filled or "wound" like other disk-bobbins. The end of this thread is then passed through the lateral hole $h$ in the bobbin-case, and the bobbin is slipped flat end foremost upon the sleeve $u$ and into the case $b^2$, which partly incloses it, so that the thread may at all times pass freely to said threading-hole. The thread is now passed diagonally across the arm $t^2$ to and into the notch $h^2$ in the outer spring, $v$, and is then drawn between the springs $v$ $v^2$ and against the pin $p^3$ by a simple lateral movement. The threaded bobbin and bobbin-case are now inserted together into the exposed bobbin-chamber $c^4$ of the shuttle S, (the shuttle being already within the race R,) and are automatically secured therein by the latch $l$, as attested by an audible click. A clear annular space of ample width is now formed outside of the catch-flange $f$, and through this space the under thread, 2, passes freely outside of the shuttle to the arm $t^2$, and from the upper extremity of this arm it passes directly to the cloth, as indicated in Fig. 1, and, being kept taut by the tension thereon, it operates to keep the arm $t^2$ in position, and therewith to keep the bobbin-case non-rotary, as aforesaid, while the machine is regularly at work.

Access to the face of the shuttle is facilitated by the removal of a dovetailed slide or sliding plate, $p^4$, from an opening, $o$, in the cloth-plate and by the removal of a screw-attached throat-plate, $p^5$, at the inner end of the same opening. The feed mechanism, also, is exposed, as shown in Fig. 2. This mechanism is illustrated more particularly by Figs. 4 and 5. The feed-cams $c$ $c^2$ are single acting, and need therefore simply be shaped so as to have the usual or desired throw. They are fastened on the under shaft, $s^2$, on the respective sides of the bearing $i^2$, by radial set-screws, and they engage respectively with the bearing-surface of a feed-bar, $B^3$, which carries said feed-dog F and receives direct the lifting-stroke, (indicated by arrow $e^x$, Fig. 5,) and with an anti-friction roller, $a^4$, Fig. 4, on a horizontal slide or yoke, $y^2$, extending at right angles from the shaft $S^2$ toward the front edge of the cloth-plate C beneath the same, and connected by a horizontal lever-arm, $l^2$, attached by a vertical pivot-screw, $s^6$, to a lateral extension of the feed-bar $B^3$, and extending through the bifurcated front end of the feed-bar and behind a fulcrum, $f^4$, to and across the path of said yoke, so as to convert the effective forward stroke of the cam $c^2$ into the effective rearward movement of the feed-dog, as indicated by arrows $f^x$, Fig. 4. A spiral retracting-spring, $r$, is applied between the rear end of the feed bar and a projection on the cloth-plate farther back, each terminating in a stud, which enters the spring and holds it in place. Lugs $l^3$ $l^4$, cast on the bottom of the cloth-plate, support the feed-bar $B^3$ and yoke $y^2$ laterally. The feed-bar is supported at its rear end by the lifting-cam $c$ and at its front end by a steel pin, $p^6$, which extends through the lugs $l^3$ and through the said fork of the feed-bar, which is formed by a screw-attached top plate, $p^7$, in combination with a body of suitable shape, the bar extension to which the lever-arm $l^2$ is attached being part of said top plate, and the yoke $y^2$ is supported at its respective ends by a fork embracing the shaft $S^2$ and a notch embracing the lever-arm $l^2$. The fulcrum $f^4$ is formed on a slide, $e^2$, which is adapted to work in a seat cut therefor in the back of the lugs $l^3$ in contact with the polished hard surface of the steel pin $p^6$, the latter being partially exposed throughout its length by said seat, and a rod extension, $r^2$, of said slide, curved to avoid contact with one of a pair of depending flanges on the cloth-plate, terminates in an integral screw-nut, $n^2$, which receives the lower end of a clamp-screw, $s^7$, working through a longitudinal slot, $t^7$, in the cloth-plate in front of the arm-standard, and provided with a milled head above the cloth-plate, as means for readily regulating or varying the length of stitch, as in other machines.

Referring, now, more particularly to Figs. 1, 3, and 6, in connection with Figs. 7 to 12, the construction of the needle-bar B and presser-bar $B^2$, with their appurtenances belonging to, inclosed in, and attached to the head H, will be more particularly described. Said bars B $B^2$ are both cylindrical, to facilitate manufacture. The needle-bar B is guided by central drilled holes in the upper and lower ends of a recessed casting, which forms the aforesaid face-plate or removable part of the head, (shown detached in Figs. $7^x$ and 11,) and is prevented from turning upon its axis by the aforesaid needle-heart $H^2$, (shown detached in Fig. 12.) This part is drilled to receive the needle-bar, and in assembling the parts is placed within the said face-plate of the head, and the needle-bar is passed therethrough in the act of inserting it into its guides. The two are then united by a set-screw, $s^9$, with said needle-heart $H^1$ at the proper height to coact with the crank-wrist of the needle-driving disk $D^1$, as aforesaid, in which position it is opposite a pair of parallel planed ways, $w^3$ $w^4$, formed on the back of said face-plate on the respective sides of the needle-bar, and said ways are traversed respectively by a solid projection, $g^3$, faced with steel, as shown in Fig. 12, and by a steel disk, which is protruded more or less from a drilled projection, $g^4$, by means of a screw, $s^6$, to prevent rattling and to take up wear, as shown more particularly by Fig. 11, otherwise the needle-heart is shaped, as shown, with reference to the omission of unnecessary metal and the avoidance of any interference between the parts.

The presser-bar $B^2$ has a lower guide similar to that of the needle-bar. Its upper end is, however, made smaller, so as to form a shoulder, against which presses the lower end of a spiral spring, $z^1$, Fig. 7$^x$, surrounding said smaller upper end of the presser-bar, and condensed (more or less) by a hollow screw, $y^1$, which forms the upper guide of said bar in an ordinary way. This bar is prevented from turning on its axis by a collar, $x^1$, drilled to receive the bar, and clamped thereon in proper position by a screw, $w^1$, Fig. 9, tapped into a boss formed on the collar and projecting into a slot, $v^1$, Fig. 1, in the face-plate, the head of the screw forming, also, a stud to coact with the lifter L, which is constructed with two shoulders to support the presser-foot at different heights, and is attached to the outer surface of the face-plate by a pivotal screw, $u^1$, and is arrested by a stop-pin, $i^1$, as shown in Fig. 1, and is operated by hand at will in customary manner.

Rigidly attached to the back of the said collar $x^1$, as shown in Figs. 7 and 9, is a lateral arm, $q^1$, having at its front end a stud-pin, by which it is coupled with a slotted lever-arm, $l^1$, Fig. 7$^x$, on the inner end of a shouldered rocking arbor, $r^1$, Fig. 7, and within a recess in the face of the integral part of the head, said arbor being mounted in a hole drilled for its reception in this part. The outer end of said arbor, which, when in position, projects from the back of the head, as shown in Figs. 3, 7, and 9, is screw-threaded, and split to receive the disks, conical wire spring, and adjusting-nut of a rotary disk, upper tension device, $t^1$, of approved form, while it serves to actuate or control a supplemental take-up, $t^0$, in the form of a helical wire spring between the back of the head H and said upper tension device, $t^1$, the inner end of this take-up spring being attached to said arbor $r^1$ by inserting it in a radial-drilled hole therein, while its outer extremity forms a loop to engage with the upper thread.

The spool $s$, Figs. 1 and 2, is mounted on a spindle, $e^1$, on the top of the arm A, and the upper thread, 1, is carried therefrom, first, through a guide, $f^1$, on the back of the head H behind the arm A, thence to the said rotary disk-tension device $t^1$ beneath the arm on the back of the head H and through the loop of the said take-up spring $t^0$, thence to the eye of the take-up lever-arm T, and thence through a guide, $g^1$, at the bottom of the head, and a threading-hole, $h^1$, at the bottom of the needle bar B, directly into the groove and eye of the needle. The addition of the said supplemental take-up and its connection with the presser-bar, as aforesaid, provide for letting down all the slack thread that may be required for the thickest goods without endangering the interference of slack thread with the formation of perfect stitches in thinner material. When the presser-bar is in its lowest position the take-up spring $t^0$ is in normal condition. When the presser-bar is supported in higher positions by one or more thicknesses of cloth—for example, beneath the presser-foot—said spring is uncoiled more or less, and its effect on the slack thread is correspondingly reduced.

The needle N is intended to be "self-setting," and to be made for this purpose with a shank having a flat face, and the needle-bar is accordingly drilled longitudinally at its lower end to receive the shank of the needle, and provided with a thumb-screw, $n^1$, for fastening the same therein by engagement with its flat face. Above this the needle-bar has been provided with an oil-guard collar, $m^1$, formed by a cup-shaped annular disk forced over the end of the bar and into position, as shown.

The presser-foot $P^2$ is attached to the lower end of the presser-bar $B^2$ in the manner before proposed, the latter being screw-threaded and provided with notches $n^4$ and a milled nut, $n^5$, for this purpose.

The above description, read in connection with my aforesaid previous specification, will enable those skilled in such arts to make and use my improved machine.

Details which are not particularly described are clearly shown in the drawings, or may be of a well-known description.

I claim as new and of my present invention—

1. A disk-shuttle having a combined bobbin latch and ejector in a single moving part, constructed with a retaining-lip and an elastic ejecting-finger at two extremities on one side of its pivot, substantially as hereinbefore specified.

2. In combination with a rotary shuttle having an open bobbin-chamber in its outer face and provided with a radial bobbin-latch projecting into said chamber through its circumferential wall, a non-rotary bobbin-case constructed with a circumferential flange to engage with said latch, substantially as hereinbefore specified.

3. A bobbin-case constructed with an arm comprising a pair of blade-springs, between which the thread is drawn from the bobbin, and a screw for separating said springs more or less to regulate the under tension, substantially as hereinbefore specified.

4. In combination with a cloth-plate having suitably-drilled and grooved depending lugs, a rotary under shaft carrying a lifting feed-cam and a stroke-cam, a feed-bar resting on said lifting-cam, and a retracting-spring applied to said feed-bar, a lever-arm crossing said feed-bar and pivoted thereto, a sliding yoke parallel to said feed-bar, having open forks at its respective ends to embrace said shaft and said lever-arm, and provided with an anti-friction roller to engage with said stroke-cam, a fulcrum-slide in front of said lever-arm, and a longitudinal steel pin in front of said fulcrum-slide, forming an abutment therefor and a support for the front end of the feed-bar, substantially as hereinbefore specified.

5. In combination with a feed-bar and fulcrum-slide working at right angles to each other, a steel pin parallel to the latter, forming at once a support for the front end of the feed-bar and a non-wearing abutment for the fulcrum-slide, substantially as hereinbefore specified.

6. A supplemental take-up comprising a helical spring with a loop at its outer extremity, a rocking arbor to which the inner end of said spring is attached, a lever-arm on the inner end of said rocking arbor, and a projection on the presser-bar coacting with said arm, substantially as hereinbefore specified.

ARTHUR M. LESLIE.

Witnesses:
GEORGE L. DAKE,
J. H. TELLER.